Dec. 7, 1965    J. S. MATTERN ETAL    3,221,365
APPARATUS FOR FORMING OPTICAL ELEMENTS
Filed Dec. 14, 1962
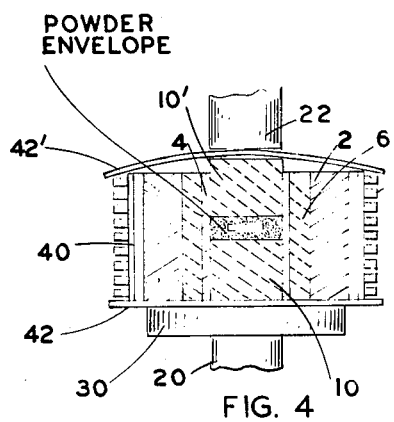
FIG. 4
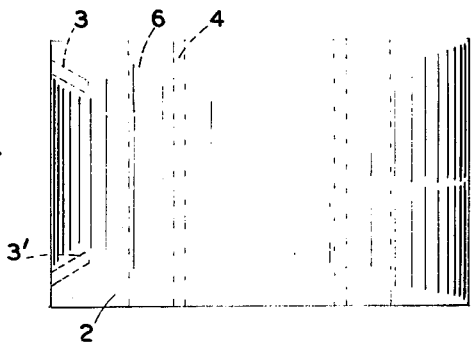
FIG. 2
FIG. 1
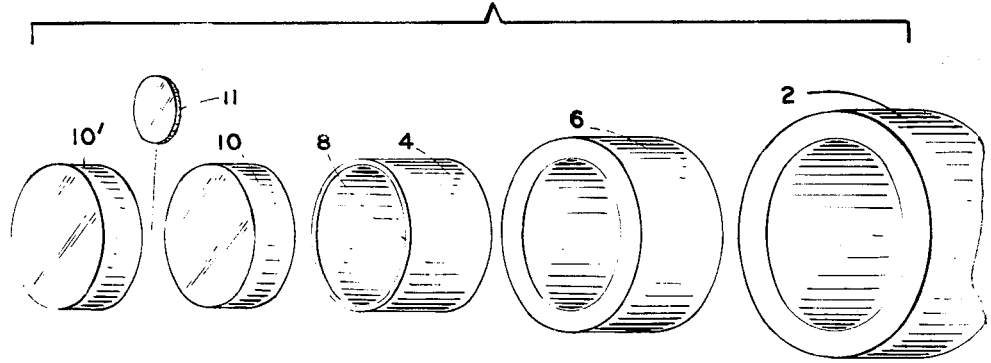
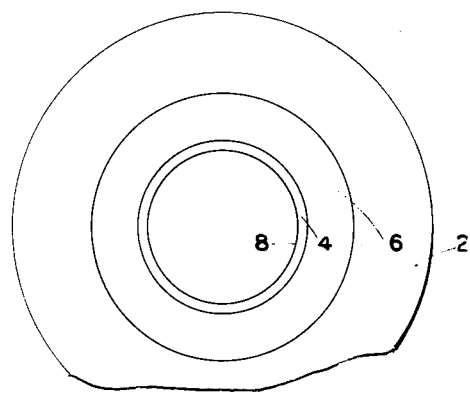
FIG. 3
JOHN S. MATTERN
RENALD R. ROBERT
INVENTORS
BY *Frank C. Parker*
*David E. Dougherty*
ATTORNEYS

United States Patent Office 3,221,365
Patented Dec. 7, 1965

3,221,365
APPARATUS FOR FORMING OPTICAL ELEMENTS
John S. Mattern, North Chili, and Renald R. Robert, Rochester, N.Y., assignors to Bausch & Lomb Incorporated, Rochester, N.Y., a corporation of New York
Filed Dec. 14, 1962, Ser. No. 244,679
5 Claims. (Cl. 18—5)

This invention relates to apparatus for forming optical elements and more particularly to apparatus for hot pressing ceramics such as barium titanate and/or sodium-potassium niobate transducers.

The increased interest in solid state ultrasonic delay line applications has resulted in an increased demand for thin section transducers. In view of the demand for transducers, efforts have been made to produce electromechanical transducers at a more economical cost. These efforts have in some cases been directed to producing niobate systems which are characterized by having a range of approximately 10 to 20 megacycles per second. Niobate systems and a method of producing them are described in an article by R. E. Jaeger and L. Edgerton in the May 1962 issue of the "Journal of American Ceramic Society, Chemical Abstracts."

Niobate transducers may be made with a suitable die and furnace. Generally an iron nickel cobalt susceptor which is approximately 3" in diameter and 2" in height is heated in a radio frequency field. The field is generated within a water cooled copper coil approximately 8" in diameter. A fused silica tube and fire-brick insulation are provided in order to decrease the radiant heat loss. The susceptor includes an alumina or a zirconia lining which forms a die wall. Alumina or zirconia rods are used for transmitting pressure to a preformed disc consisting of a niobate composition.

The niobate disc is generally about ½" in diameter and approximately ⅛" thick. This disc is imbedded in a fine high purity zirconia powder through which the pressure is transmitted. This powder separates the reactive niobate from the walls of the die and the faces of the plunger, and allows ejection of the disc at the completion of the cycle. Conventional hydraulic rams are used for applying pressure to the zirconia rods.

One serious problem associated with the aforementioned process is that a relatively high rejection rate is encountered. The rejection rate is caused by cracking of the disc during the pressing operation or during the cooling and removal stages. The costs are further increased by the necessity of frequently replacing the ceramic tubes which are used in the process. These tubes are manufactured to relatively close tolerances from relatively pure alumina or zirconia in order to eliminate contamination or reduction of the niobate during the process. These ceramic tubes are relatively expensive, and since they are damaged by both mechanical and heat shock, they seldom last for more than a few cycles.

It is contemplated by the present invention to provide a new and improved apparatus for forming niobate transducers. The size of such transducers may be up to or greater than 1" in diameter. The use of this apparatus substantially reduces the rejection rate of niobate transducers. The apparatus is relatively inexpensive and incorporates a ductal member which is less sensitive to heat and mechanical shock than a ceramic member. The ductal member also tends to protect the niobate from contamination or reduction while the niobate is maintained at a high temperature and pressure and precludes point stresses which may result in unacceptable transducers. Even when this ductal member has been deformed by successive cycles at high temperatures and relatively great pressures, it may be refabricated at a relatively low cost, and subsequently used for additional cycles.

Briefly, it is contemplated by the present invention to incorporate a noble metal sleeve consisting essentially of platinum in the system. The use of noble metal tends to minimize the reducing action often encountered while maintaining powders at elevated temperatures. Furthermore the ductal characteristics tend to overcome damage due to thermo or mechanical shock. In some cases an alloy such as 80% platinum and 20% rhodium has been found desirable.

The invention will now be described in more detail in connection with the accompanying drawings in which, FIG. 1 is an exploded perspective view of the novel apparatus according to the present invention;

FIG. 2 is a cross sectional view of the apparatus shown in FIG. 1;

FIG. 3 is a top plan view of the apparatus shown in FIGS. 1 and 2, and

FIG. 4 is a cross sectional view of the novel apparatus combined with heating and pressure supplying means.

Referring now more particularly to the drawings wherein like reference numerals have been used to illustrate like parts, a susceptor 2 consisting of an iron nickel cobalt alloy such as "Inconel" supplied by International Nickel Company, is approximately 3" in diameter, and has a ring-like or cylindrical shape defining a cavity. A cylinder 4 preferably of platinum, having a diameter smaller than the inner diameter of the susceptor 2 is placed within the cavity defined by the susceptor 2. This cylinder 4 is separated from the susceptor by powdered alumina, zirconia, zircon or some other suitable ramming material 6 which upon setting and firing becomes rigid and dense. The powdered material is packed between the cylinder 4 and the susceptor 2 to form a composite structure.

The cylinder 4 defines an inner surface 8 which is a platinum surface according to the preferred embodiment of the invention. The cylinder 4 which may be considered to be a platinum tube is disposed on a platform 30. The platform 30 consists essentially of an iron nickel cobalt alloy. The alloy was selected since it readily withstands the pressure and temperature requirements for manufacturing transducers. An alumina or zirconia plunger 10 which is adapted to pass through the cylinder 4, is inserted in the bottom of the cylinder 4, and is supported along with the composite structure including the cylinder 4 by the platform 30. The plunger 10 is preferably in sliding contact with the cylinder 4.

A layer of non reactive powder such as zirconia covers the plunger 10 and separates a preformed disc 11 which consists essentially of sodium potassium niobate from the plunger 10. After placing the disc 11 on the layer of non reactive powder, a second portion of non reactive powder is added to thereby cover the disc 11. The second portion of powder separates the disc 11 from a second or top plunger 10'.

Pressure is applied to the refractory plungers by means of hydraulic rams 20, 22 to thereby transmit pressure through the non reactive powder envelope through the disc 11. The entire structure is heated to a temperature within the range of 1800° to 2350° F. while maintaining uni-axial pressure within the range of 1500 to 4000 p.s.i. on the disc 11. The temperature is raised by means of the concentric elements 24 which are connected to an induction heater.

The susceptor 2 also defines a pair of cavities 3, 3' which are adapted to receive a pair of thermocouples for measuring and controlling the temperature of the device.

An additional feature of the invention relates to the combination of the aforementioned novel apparatus with a relatively inexpensive furnace which tends to minimize the capital investment required for manufacturing transducers. In the aforementioned apparatus, the cost of producing transducers are reduced by overcoming the necessity of close tolerances and also by reducing the rejection rate of finished transducers.

Further reductions in cost have been achieved by placing a lining 40 consisting essentially of fibrous potassium titanate on an inner portion between the concentric heating elements 24 and the susceptor 2. Fibrous potassium titanate is obtainable from E. I. du Pont de Nemours and is marketed under the tradename "Tipersul." A first layer of fibrous mullite 42 separates the platform 30 from the susceptor 2 while a second layer 42' separates the ram 24 from the plunger 10'. This material acts as a heat barrier, however, allows pressure to be transmitted therethrough to the ceramic plungers.

What is claimed is:

1. Apparatus for hot pressing ceramic material comprising a susceptor, a pressed ceramic ring confined by said susceptor and a tube consisting essentially of platinum disposed concentric with said ring and separated from said susceptor by said ring, a powder envelope confined by said tube and a pair of ceramic plungers in sliding contact with said tube and adapted to transmit pressure through said powder envelope to a ceramic material disposed within said powder envelope and between said plungers.

2. Apparatus according to claim 1 in which the tube consists essentially of 80% platinum and 20% rhodium.

3. Apparatus for hot pressing ceramic material comprising an iron nickel cobalt susceptor, a pressed ceramic ring consisting of a composite mass of refractory material confined by said susceptor and a tube consisting essentially of platinum disposed concentric with said ring and separated from said susceptor by said ring, a powder envelope confined by said tube and a pair of alumina plungers in sliding contact with said tube and adapted to transmit pressure through said powder envelope to a ceramic material disposed within said powder envelope and between said plungers.

4. In combination, induction heating means, pressure transmitting means capable of exerting 1500 to 4000 p.s.i., and apparatus comprising a susceptor, a pressed ceramic ring comprising a composite mass of material selected from the group consisting of alumina and zirconia confined by said susceptor and a tube consisting essentially of platinum disposed concentric with said ring and separated from said susceptor by said ring, a powder envelope confined by said tube and a pair of ceramic plungers in sliding contact with said tube and adapted to transmit pressure from said pressure transmitting means through said powder envelope to ceramic material disposed within said powder envelope and between said plungers, and said susceptor disposed within the field generated by said induction heating means to thereby apply heat and pressure to said ceramic material.

5. The combination according to claim 4 which includes a lining of fibrous potassium titanate surrounding the susceptor and separating the susceptor from the induction heating means, and a layer of fibrous mullite separating the susceptor from the pressure transmitting means.

References Cited by the Examiner

UNITED STATES PATENTS

| | | | |
|---|---|---|---|
| 2,022,528 | 11/1935 | Taylor | 18—16.5 X |
| 2,437,127 | 3/1948 | Richardson | 18—16.5 |
| 2,677,005 | 4/1954 | Land et al. | 75—172 X |
| 2,990,602 | 7/1961 | Brandmayr et al. | 264—332 |
| 3,020,617 | 2/1962 | Dopera | 25—153 |
| 3,085,291 | 4/1963 | Haes | 18—47 X |

OTHER REFERENCES

Mark's Mechanical Engineering Handbook, 5th ed. rev. N.Y. McGraw-Hill 1951, pp. 630 and 2025, TJ 151 M37.

Plastic News-Plastic and Resin Industry, August 1944, page 23.

J. SPENCER OVERHOLSER, *Primary Examiner.*

ROBERT F. WHITE, *Examiner.*